(12) United States Patent  
Park (10) Patent No.: US 8,750,489 B2
(45) Date of Patent: Jun. 10, 2014

(54) SYSTEM AND METHOD FOR AUTOMATIC CALL SEGMENTATION AT CALL CENTER

(75) Inventor: Youngja Park, Edgewater, NJ (US)

(73) Assignee: International Business Machines Corporation, Armonk, NY (US)

(*) Notice: Subject to any disclaimer, the term of this patent is extended or adjusted under 35 U.S.C. 154(b) by 1294 days.

(21) Appl. No.: 12/257,037

(22) Filed: Oct. 23, 2008

(65) Prior Publication Data

US 2010/0104086 A1    Apr. 29, 2010

(51) Int. Cl.
*H04M 3/00* (2006.01)
*H04M 5/00* (2006.01)
*H04M 1/64* (2006.01)
*G10L 15/00* (2013.01)
*G10L 17/00* (2013.01)
*G10L 15/04* (2013.01)

(52) U.S. Cl.
USPC ............. 379/266.1; 379/88.01; 704/246; 704/251

(58) Field of Classification Search
USPC .......... 379/265.09, 88.01, 266.1, 243, 88.04, 379/72, 85, 71; 704/246, 245, 251
See application file for complete search history.

(56) References Cited

U.S. PATENT DOCUMENTS

| 7,930,179 B1 * | 4/2011 | Gorin et al. ................. 704/246 |
| 2009/0097634 A1 * | 4/2009 | Nambiar et al. ......... 379/265.09 |
| 2009/0112588 A1 * | 4/2009 | Kummamuru et al. ....... 704/245 |

* cited by examiner

*Primary Examiner* — Thjuan K Addy
(74) *Attorney, Agent, or Firm* — Preston J. Young; Anne Vachon Dougherty (57) ABSTRACT

A system and method for automatic call segmentation including steps and means for automatically detecting boundaries between utterances in the call transcripts; automatically classifying utterances into target call sections; automatically partitioning the call transcript into call segments; and outputting a segmented call transcript. A training method and apparatus for training the system to perform automatic call segmentation includes steps and means for providing at least one training transcript with annotated call sections; normalizing the at least one training transcript; and performing statistical analysis on the at least one training transcript.

24 Claims, 3 Drawing Sheets

SYSTEM AND METHOD FOR AUTOMATIC CALL SEGMENTATION AT CALL CENTER

FIELD OF THE INVENTION

The invention relates generally to automatic characterization of calls received at a call center and more specifically to automatically segmenting and classifying call segments for search and retrieval.

BACKGROUND OF THE INVENTION

Most medium to large businesses operate customer contact centers to provide services to customers. Modern contact centers often support various channels of communication for customer interactions, including telephony, e-mails, webpage forms and instant messaging. Telephony includes automatic call handling as well as call handling by human agents at the call centers. The majority of current contact center interactions comprise telephone conversations between contact center agents and customers.

Customer and agent conversations are a valuable source of insights into the contact center operations as well as the company's overall business. For instance, in depth analysis of call center conversations can enable measurement of customer satisfaction, identification of additional sales opportunities, identification of recurrent issues, and monitoring of contact center performance. However, when faced with a huge volume of calls, companies are not able to fully utilize the available information.

Existing techniques for call analysis are generally limited to applying natural language processing (NLP) techniques to automatic call routing through an interactive voice response system and call topic classification based on a predefined domain taxonomy. However, it is desirable to automatically provide ongoing learning from past interactions not only for call routing, but also for automated call handling, expedited call resolution, satisfaction monitoring, performance monitoring and information gathering.

Most contact center calls follow a well defined script or guideline. For example, a customer call to a contact center usually starts with a greeting and then proceeds into problem description, research on the problem, solution presentation, and a closing segment. Call segmentation and analysis of the call segments can improve search and retrieval functions and provide more detailed call statistics enabling interesting applications for business intelligence. For instance, contact centers today can determine the overall elapsed call handling time for an agent through the telephony system but cannot determine how the agent had spent the elapsed time (e.g., how long the agent takes to understand the customer's question; how long it takes the agent to identify a solution, or how long it takes for the agent to explain the solution to the customer). The time statistics for different call segments would be valuable to help contact center managers identify areas for improvement. For instance, the management could identify call topics which typically take a very long resolution time and provide additional agent training on the identified call topics.

Currently, call center consulting companies identify call segments manually. Consultants analyze calls by listening to live or recorded calls and by measuring the time statistics on a few important call sections manually. Since the manual approach is expensive and slow, contact centers can study only a very small number of calls.

It is, accordingly, an objective of the invention to provide automatic call segmentation for analysis of contact center calls.

SUMMARY OF INVENTION

The present invention provides automatic segmentation of contact center calls by applying natural language processing and machine learning technologies to automatically identify call segments in a contact center call.

The method for automatic segmentation of call transcripts comprises the steps of automatically detecting utterance boundaries in the call transcripts; automatically classifying utterances into target call sections; automatically partitioning the call transcript into call segments; and outputting a segmented call transcript. The partitioning may comprise merging utterances into call segments including at least one of merging adjacent utterances which are classified into same call sections and merging short call sections into previous call sections.

The method may further comprise normalizing speech from the transcript prior to detecting utterance boundaries. The method may also comprise recognizing each utterance and identifying a speaker as one of a customer and an agent for each utterance, with reference to speaker identifying keywords in a database.

The automatic detecting of utterance boundaries is preferably based on analysis of call transcript sections as compared to learned statistics in an utterance boundary detection model.

The automatic classifying may be done by detecting at least one predefined feature in the utterance and computing a most likely target call section type for the utterance.

The system for automatic segmentation of call transcripts preferably comprises a segmentator component for automatically detecting boundaries between utterances in the call transcripts, for automatically classifying utterances into target call sections, and for automatically partitioning the call transcript into call segments; and an annotator component for annotating the call transcript and for outputting a segmented call transcript.

The system preferably also includes at least one database for storing at least a call segment classification model and an utterance boundary detection model and may also include at least one of an automatic speech recognition (ASR) engine, a speaker identification component, and a normalization component for normalizing said call transcript.

A method for training a system to perform automatic segmentation of call transcripts comprises steps of providing at least one training transcript with annotated call sections; normalizing the at least one training transcript; and performing statistical analysis on the at least one training transcript.

Apparatus for training a system to perform automatic segmentation of call transcripts comprises a normalization component for obtaining at least one training transcript with annotated call sections and normalizing the at least one training transcript; and a statistical analysis component for performing statistical analysis on the at least one training transcript.

BRIEF DESCRIPTION OF THE DRAWINGS

The invention will now be described with reference to the accompanying figures in which.

DETAILED DESCRIPTION OF THE INVENTION

The method and system of the present invention automatically identify different segments in contact center calls and divide a call transcript into different call sections. The target data comprise spontaneous speech conversations between customers and service representatives. Call segments can be defined based on the needs of a contact center. Some call segments are generic across companies (e.g., greeting segment, problem description segment, and closing segment), and some call segments are specific to a company or an industry (e.g., vehicle identification segment for automotive industry). A representative set of call segments includes a Greeting section, a Question section, a Refinement section, a Research section, a Resolution section and a Closing section. Calls frequently include filler conversation which is generally not related to the purpose of the call. Such conversation is grouped into an "Out of Topic" section. The foregoing seven target call sections have been identified because they tend to appear in all contact center calls. Clearly, however, the sections can vary across companies and industries. Since this invention uses a machine learning approach, it can handle different sets of call segments without modifying the system for different companies in different industries. It is also to be noted that not all call sections appear in every call. Further, a call section may appear multiple times in a single call transcript (e.g., a call may have multiple "Greeting" sections due to the call being transferred to different agents).

The present call segmentation system identifies utterances in a call transcript and applies a machine learning method such as a support vector machine (SVM) classifier to assign one of the target call sections to each utterance. Utterance boundaries are automatically recognized based on a statistical approach. Once the sections of the utterances have been classified, the adjacent utterances are merged if they have been classified into a same section. Finally, a segmented transcript is output for storage and use.

Figure 1:
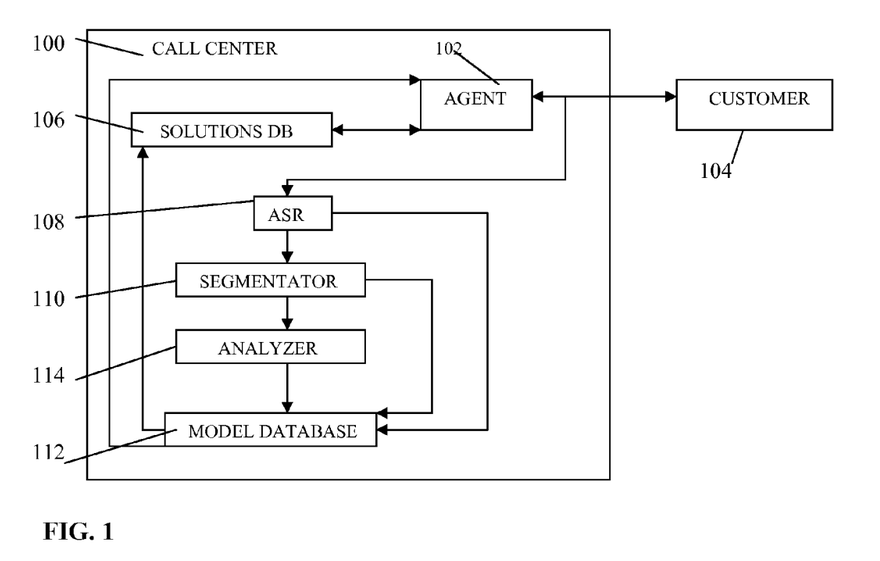
FIG. 1 is a block diagram of a system for implementing the present invention.

FIG. 1 is a block diagram of a system for implementing the present invention. A customer places a call from a customer location 104 to a call center 100. At the call center, an agent 102 interacts with the customer. As noted above, the agent may be a human call center representative or an automated call processing agent. Generally, both human and automated agents are available at call centers. An agent logs the customer call, either automatically or by human data entry or a combination of automatic capture (e.g., automatic identification of the customer's telephone number, assignment of a "ticket number" for tracking the call interaction) and human data entry. The agent 102 has access to at least one database, representatively shown as solutions database 106, for researching the customer's question.

Under the present invention, the call center additionally comprises an automated speech recognition engine (ASR) 108 to generate a transcript of the call, a segmentator component 110 for receiving a call transcript and for performing the steps of utterance boundary detection, utterance classification and utterance merging to output a segmented call transcript, as further detailed below. The call center may additionally include one or more storage locations 112 for storing the training corpus of pre-annotated call transcripts, a classification model, call transcripts and segmented call transcripts. The storage location may be combined with the aforementioned solutions database.

The call center may also include one or more analysis components 114 for automatically analyzing the segmented call transcripts to identify, for example, calls with Question and Resolution sections of short duration. Such analysis components can additionally make use of existing text analysis approaches to identify similarities in Question segments of call transcripts to provide searchable Question and Resolution shortcut files for agent use at the solutions database 106. Updated scripts for human as well as automated agents can be generated by the analysis component(s). The call center may be additionally adapted to provide feedback locally to the agent 102 or the solutions database 106 or may be adapted to send segmented call transcripts and/or analysis results to remote locations (e.g., client marketing departments, software developers, et cetera).

Figure 2:
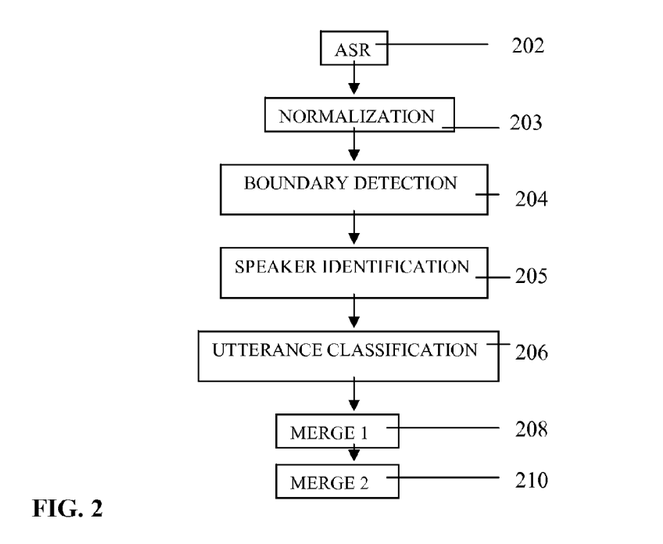
FIG. 2 is a basic process flow for implementing the present invention.

FIG. 2 is a basic process flow for implementing the present invention. After automatic speech recognition (ASR) at 202, the process proceeds to a step of utterance boundary detection, at step 204, followed by utterance classification at 206 and utterance merging at steps 208 and 210. Individual utterances are the base units for call section segmentation. However, speech transcripts generated by an ASR system do not ordinarily include boundary information. Accordingly, it is necessary to identify utterances for call transcript segmentation.

Automatically identifying utterance boundaries in an automatic speech transcript presents several challenges. Firstly, the transcripts have no punctuation marks or case information, which are often used as cues for sentence boundary recognition in non-ASR systems. Secondly, the speaker turns in automatic speech recognition transcripts are often inaccurate and unreliable. One speaker turn often contains speech from both speakers. Thirdly, automatic speech recognizers can have fairly high word error rates (WER), on the order of ~42% errors. The word error rate tends to be even higher for domain-specific words because so many of the domain-specific words are "out of vocabulary" for the ASR systems, making text analysis even more difficult. The present segmentation system is provided to operate on transcripts generated by an ASR system; however, it need not be integrated into the ASR system. It can be added to an existing system without requiring replacement of an existing ASR component.

For the present invention, the task of utterance boundary detection is regarded as a binary classification problem. For each word boundary, the system decides if the word boundary is an utterance boundary or not. The primary goal is to identify call sections, with utterances being used as base units for finding correct section boundaries. A machine learning method for utterance boundary detection is employed. The system is trained using transcripts which contain accurate utterance changes and speaker turns from known transcripts.

The learning process proceeds as follows: Words are first normalized in the transcripts and a word feature set W is generated. The word feature set W is a set of words that appear in the training corpus after a series of normalization steps. A first normalization step includes normalizing all filler words into an artificial generic word (F). Filler words are words that people often say unconsciously and that add no meaning to the communication. Examples of filler words are "um", "uhh" and "ah". While filler words can be removed rather than normalized, they are often good indicators for utterance boundaries (e.g., "um, I have a problem"). A second normalization step normalizes all numeric tokens and special expressions such as telephone numbers, account numbers, URLs, and e-mail addresses into an artificial generic word (E). Pattern-based grammars are used to recognize these numeric tokens and special expressions. Finally, a third normalization step retrieves all lemma forms, $\{L_1, \ldots, L_n\}$, of all other words in the training data, $\{w_1, \ldots, w_n\}$ A tokenizer and part-of-speech tagger are used to extract the lemmas. The word feature set is defined as $\{F, E, L_1, \ldots, L_n\}$.

The second step of the learning process is to learn the following statistics from the training transcripts and apply those statistics for analyzing the call transcript. Suppose there is an utterance boundary between $w_i$ and $w_j$ (i.e., $w_i$ is the last word of an utterance and $w_j$ is the first word of the next utterance).

$P_L(w_{i-1}, w_i)$ is the probability of $w_{i-1}$ and $w_i$ being the last two words of an utterance;

$P_L(w_i)$ is the probability of $w_i$ being the last word of an utterance;

$P_F(w_j)$ is the probability of $w_j$ being the first word of an utterance;

$P_F(w_j, w_{j+1})$ is the probability of $w_j$ and $w_{j+1}$ being the first two words of an utterance;

$C(w_i, w_j)$ is the correlation coefficient of $w_i$ and $w_j$ appearing as a bigram within an utterance, wherein the bigram is computed by using Dice coefficient $$\frac{(2 * f(w_i, w_j))}{f(w_i) + f(w_j)};$$ (Equation 1)

where $f(w_i)$ and $f(w_j)$ are the counts of word $w_i$ and word $w_j$ in the training corpus respectively. $f(w_i, w_j)$ is the count of a bigram $(w_i, w_j)$ in the training corpus.

Pause $(w_i, w_j)$ is the time duration from the end of $w_i$ and the start of $w_j$; and Length (U) is the number of words in utterance U, wherein U is defined as an utterance if $w_i$ is determined to be an utterance boundary.

For a new transcript, the utterance boundary detection system decides if a word boundary is an utterance boundary or not based on the learned statistics. As a result of the learning or training process, an utterance boundary detection model and a classification model are stored for use in segmentation, as further detailed below with reference to FIG. 4.

It is additionally useful to perform speaker identification in the call transcript. For instance, a Greeting section usually begins with an agent's utterance, while a Question section begins with a customer's utterance. The speaker identification step automatically determines who (the agent or the customer) spoke a given utterance. The knowledge on the speaker greatly improves the tasks of identifying utterance boundaries and classifying the utterances into target call sections (e.g., "Question" section, et cetera). Contact center calls have two speaker types, customer and agent. Often more than one agent is involved in a call (typically at least one automated agent as well as at least one human operator), but it is not necessary to distinguish between different call center agents. As such, every utterance is classified into either "agent" speech or "customer" speech.

Typically certain words are used more frequently by one speaker (e.g., the call center agent) than by the other speaker (i.e., the customer). The speaker of an utterance can be recognized based on appearance of "speaker-identifying words" in the call transcript. Speaker-identifying words for customers may include "I", "know", "try", "thing", "think", "message", "late", "guess", "sorry", and "before" while agent words include "you", "hold", "number", "click", "hello", "ticket", "type", "serial", "sir", "service", and "select" for conversations at an IT (Information Technology) contact center.

Extraction of speaker-identifying words is done automatically by evaluating the training data. For each word w that appears many times (e.g., 10 times or more) in the training data, the probabilities p(agent|w) and p(customer|w) are computed. In the training data, transcripts are manually marked with accurate speaker identifications. If the difference between the two probabilities is greater than a predetermined threshold (e.g., 0.2), then the word, w, is regarded as a speaker-identifying keyword. Furthermore, w is regarded as an agent keyword if p(agent|w) is greater than p(customer|w) for that word, and vice versa.

The speaker of an utterance is determined based on the number of agent keywords and customer keywords in the utterance. If an utterance contains more keywords from the agent keyword list, the agent is regarded as the speaker of the utterance. In the same way, the customer is regarded as the speaker if the utterance contains more keywords found in the customer keyword list. If the frequencies for the two keywords sets are equal, the opposite speaker from the previous utterance is assigned.

After utterance boundary detection at 204 and speaker identification at 205, the utterances are classified into section types at step 206. Any machine learning approach that supports multi-class classification can be applied. In a preferred embodiment, support vector machines (SVMs) are used for identifying call section types for the utterances. SVMs find a hyperplane which splits the positive examples (i.e., utterances which belong in a given call section) from negative examples (i.e., utterances which are not appropriately classified in the given call section) with the largest distance between the two example sets. Preferably, an LIBSVM (i.e., library for support vector machines) implementation is used, and specifically a C-support vector classification (C-SVC) with a radial basis function (RBF) kernel is used. C-SVC solves the following problem:

$$\min_{w, b, \varepsilon} \frac{1}{2} w^T w + C \sum_{i=1}^{l} \varepsilon_i$$ (Equation 2)

subject to $y_i(w^T \phi(x_i) + b) \geq 1 - \varepsilon_i$,
$\varepsilon_i \geq 0$, $i = 1, \ldots, 1$
given training vectors $x_i \in R^n$, $i = 1, \ldots, l$ and an answer vector $y \in R^1$. C-SVC is designed for two class classification problems. For multi-class (k) classification like the present problem, LIBSVM uses the "one-against-one" approach to classification in which $$\frac{k(k-1)}{2}$$

classifiers are constructed and each one trains data from two different classes.

Predefined features are used for utterance classification including, but not limited to, speaker identification, call section type of the previous utterance, position of the utterance in the transcript, number of domain specific words in the utterance, and words that appear multiple times in the training data.

The speaker identification feature is the knowledge about the speaker of an utterance which can help identify the call section type. In most contact center calls, the agent initiates the Greeting section and the Resolution section, and the customer begins the Question section. The speaker identification recognized by the algorithm described previously is used as a feature for utterance classification.

The call section type of the previous utterance is also used as a feature. Most contact center conversations follow a well-defined sequence of Greeting, Question, Research, Resolution and, finally, Closing. Therefore, the previous section type can be used to identify the section type of the current utterance. For instance, if the previous utterance belongs to the Greeting section, the current utterance is likely to be more of the Greeting section or the beginning of the Question section. In training mode, the previous section type marked in the training data is used. In execution mode, the previous section type returned by the SVM classifier is used. For the first utterance in a call, the value of this feature is set to "NoSection".

An additional feature for use in utterance classification is the position of the utterance in the transcript. It has been observed that the first several utterances likely belong to the Greeting section and the Question section. Likewise, the last several utterances belong to the Resolution and Closing sections. The location information for utterances in the middle of a call, however, does not provide much additional information for classification, since the lengths of calls vary. Based on this observation, two positional features are included in the feature set, namely the position from the beginning of the call and the position from the end of the call. Sequential values from 1 to x, for example from 1 to 20, is assigned for each of the first X (e.g., 20) utterances and an arbitrary number n>x (or x>20) is assigned to the remaining utterances. The second position feature is set in the same way. A sequential value from 1 to y (e.g., 1-20) is assigned to each of the bottom y (e.g., 20) utterances and n is assigned to the remaining utterances.

The number of domain specific words in the utterance is also used as a feature for utterance classification. The Question section and the Resolution section are likely to contain many domain-specific terms, for instance, "password" and "Windows" for an IT domain. On the other hand, the Out-of-topic section may contain many terms related to other domains, such as the weather or an upcoming holiday. Therefore, the number of in-domain terms in an utterance is a good indicator for identifying certain sections, such as the Question and Resolution sections.

The domain specificity of all words in the training corpus is computed and stored. The domain specificity of a word is computed based on the relative probability of its occurrence in the training transcripts against its occurrence in a general corpus. A word is regarded as domain-specific if the domain specificity of the word is greater than the average domain specificity of all the words in the training data.

Words that appear more than once in the training data also are indicators, or features, for utterance classification. In addition to the features described above, words present in the training data are used as features. The lemma forms of the words that appear more than once in the training corpus are extracted as word features. Stop words, such as determiners and prepositions, and filler words are excluded from the word feature set. The feature value of a word feature is its frequency in a given utterance.

A target bounded utterance is evaluated to determine the feature set for the target utterance. Then, the SVM classifier takes the available features and computes the most likely classification section type for the utterance as the utterance classification result.

The utterance classification result is then used to partition a call transcript into different sections. The partitioning is conducted by merging adjacent utterances by two steps, as shown at 208 and 210. First, the utterances which are adjacent and are classified into a same call section type are merged into a call section at step 208. The next step, at 210, is to find very short call sections which are located between two long sections. The length of an utterance is determined in two ways. If the utterance has fewer than $\omega$ words or the time duration of the utterance is shorter than $\partial$ seconds, the utterance is regarded as short. In most cases, these call sections are results of classification errors due to the small number of words in the utterances. These short call sections are merged into the previous section. In a preferred embodiment, $\omega$ is set to 5 and $\partial$ is set to 3.

Figure 3:
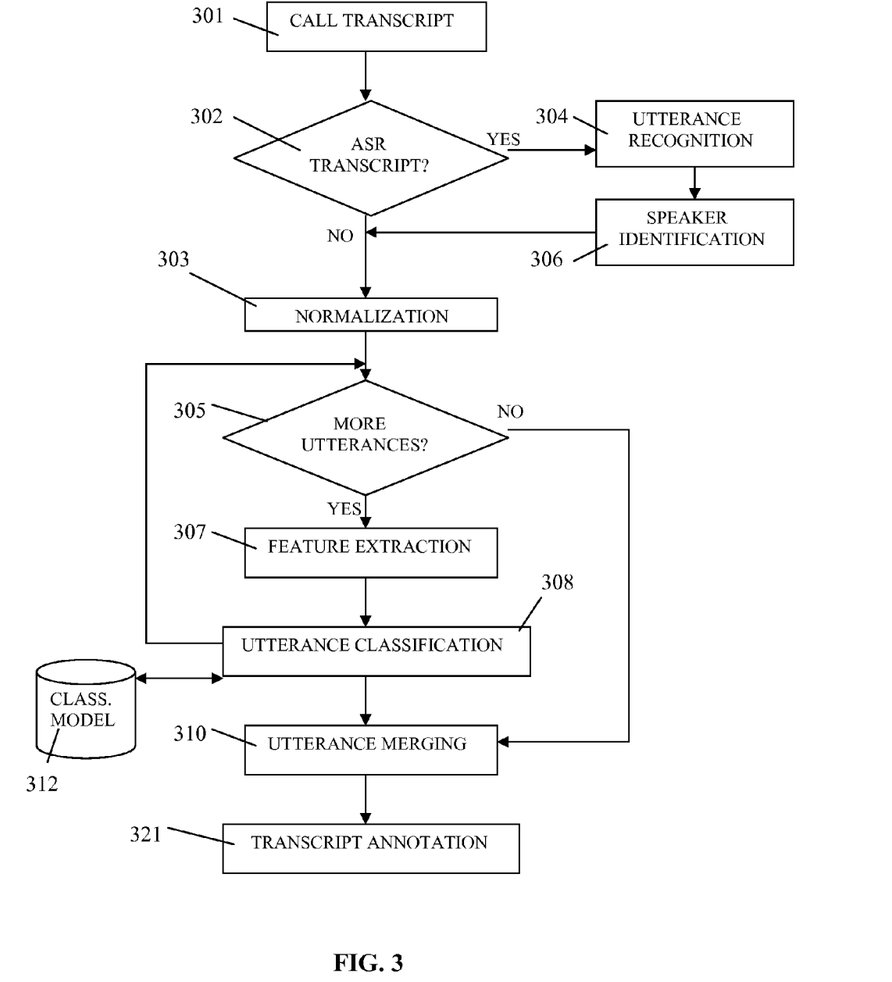
FIG. 3 illustrates a process flow for call segmentation and classification of call segments in a trained system.

FIG. 3 illustrates a more detailed process flow for call segmentation and classification of call segments in a trained system. When a call transcript is input at 301, it is determined whether the transcript is an ASR transcript at step 302. If it is determined that the call transcript is an ASR or other type of call transcript, utterance recognition (or boundary detection) is done at 304 and speaker identification is performed at 306. If the input call transcript is not an ASR transcript, then utterance boundary detection and speaker identification steps can be skipped assuming that the information is already available in the transcript. Normalization is done at 303, and, if there are more utterances, as determined at 305, feature extraction is done at 307 and utterance classification is done at 308 using the classification model 312. Once utterance classification has been completed for all utterances, as determined at 305, utterances are merged at 310 as detailed with reference to FIG. 2 above. Once utterances are merged, annotation of the transcript with segments is done at 321 and the annotated transcript with segments is provided for analysis or storage.

Figure 4:
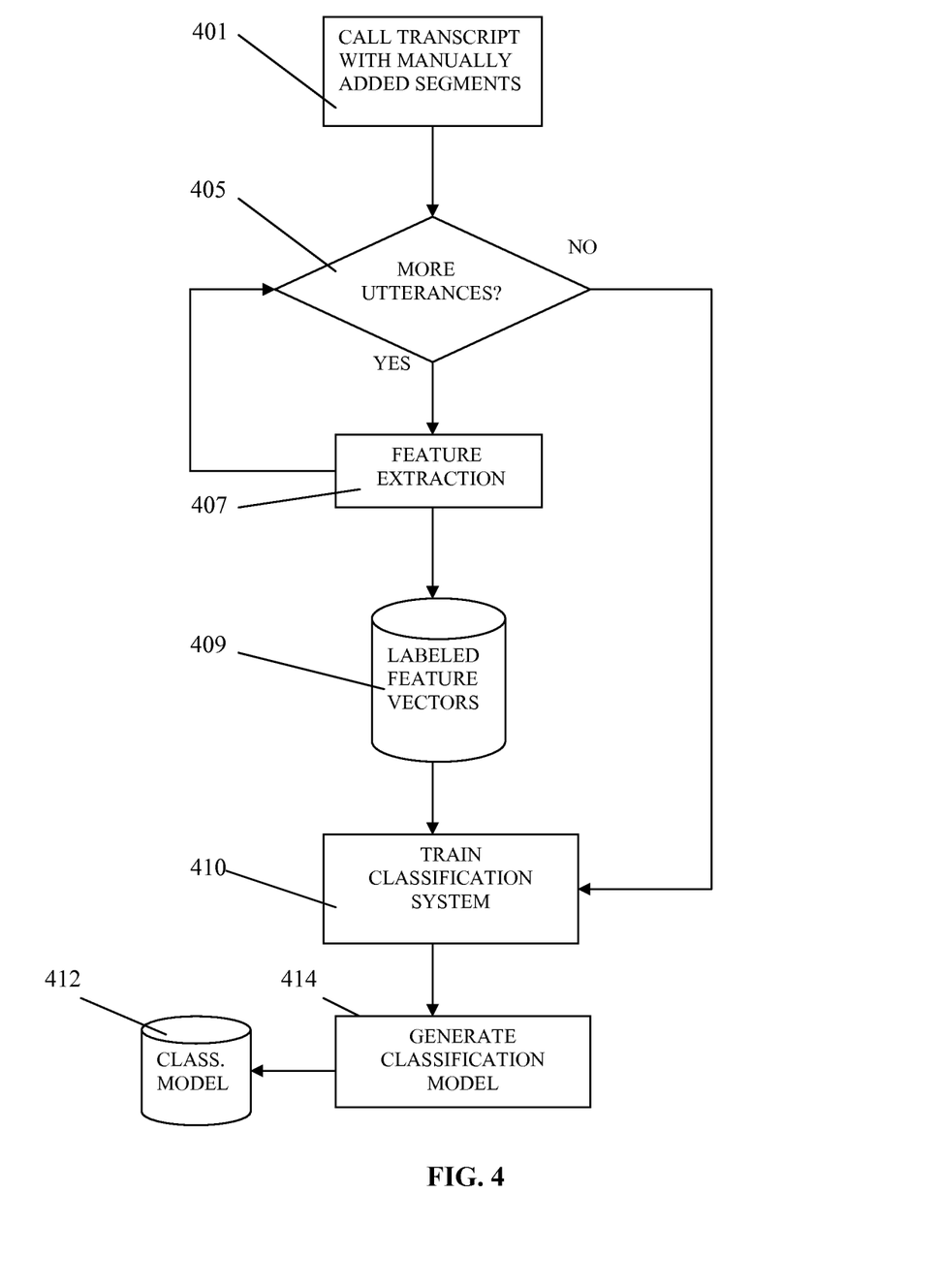
FIG. 4 illustrates a process flow for training a call segmentation and classification system.

FIG. 4 illustrates a process flow for training a call segmentation and classification system. The system first learns from transcripts which have been pre-annotated manually with call segments and provided to the system at 401. For each utterance, as determined at 405, features are extracted at 407 and a segment label is assigned for each utterance in the training set of transcripts, at 409. The segmentation system is trained with the data at 410. The system generates an utterance boundary detection model and a section classification model at step 414. The models are stored at 412 for use by the segmentator component.

Once a transcript with segments has been produced, the information can be useful for future calls. For example, if a call center agent can find a previous call that is identical to or very similar to an in-coming call by viewing the "Question" section of segmented call transcripts, the agent can reduce the call handling time by extracting the solution to the present customer's question from the prior call. By matching only the "Question" sections of the in-coming and previous calls, one can more easily find calls having identical or similar problems.

Another use for segmented call transcripts is to identify calls that may be good candidates for self-service or automation. When a great number of calls to a call center have the same "Question" section, it may be advantageous for the call center to implement an automatic call processing menu to vet those calls by subject matter for expeditious handling, by presenting the customer with a menu option directed to the frequently-addressed question and its solution. Similarly, calls having very short "Question" and "Resolution" sections can be scripted for self-service, thereby cutting contact center operating costs. As noted above, time statistics for different call segments can also help contact center managers identify call topics which typically take a very long resolution time, whereupon the managers can provide additional agent training on the identified call topics. Feedback to in-house or client-based product development departments can serve as consumer product market research to identify technical glitches in products or the like.

The methodologies of embodiments of the invention may be particularly well-suited for use in an electronic device or alternative system. Accordingly, the present invention may take the form of an entirely hardware embodiment, an entirely software embodiment (including firmware, resident software, micro-code, etc. and processor for executing same) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be loaded onto a computer or other programmable data processing apparatus to cause a series of operational steps to be performed on the computer or other programmable apparatus to produce a computer implemented process such that the instructions, when executed on the computer or other programmable apparatus, provide processes for implementing the functions/acts specified in the flowchart and/or block diagram block or blocks.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as heretofore described, may be stored in one or more of the associated storage media (e.g., ROM, fixed or removable storage) and, when ready to be utilized, loaded in whole or in part (e.g., into RAM) and executed by a processor. In any case, it is to be appreciated that at least a portion of the components shown in the above figures may be implemented in various forms of hardware, software, or combinations thereof. Given the teachings of the invention provided herein, one of ordinary skill in the art will be able to contemplate other implementations of the components of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. The embodiment was chosen and described in order to best explain the principles of the invention and the practical application, and to enable others of ordinary skill in the art to understand the invention for various embodiments with various modifications as are suited to the particular use contemplated. Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

The invention claimed is:

1. A method for automatic segmentation of call transcripts into content-based call segments comprising the steps of:
   automatically detecting boundaries between utterances in call transcripts;
   automatically classifying utterances into target call sections based on contents of at least one of the utterances;
   automatically partitioning the call transcript into content-based call segments; and
   outputting a segmented call transcript.

2. The method of claim 1 wherein partitioning comprises merging utterances into call segments.

3. The method of claim 2 wherein said merging comprises at least one of merging adjacent utterances which are classified into same call sections and merging short call sections into previous call sections.

4. The method of claim 3 wherein said merging short call sections comprises the steps of:
   comparing a length of each utterance to a predefined standard; and
   identifying an utterance as short based on a predetermined relationship to the predefined standard.

5. The method of claim 4 wherein the predefined standard comprises at least one of a number of words and a time duration for the utterance.

6. The method of claim 1 further comprising normalizing speech from the transcript prior to detecting utterance boundaries.

7. The method of claim 6 wherein the normalizing comprises the steps of:
   normalizing all filler words into a first artificial generic word;
   normalizing numeric tokens and special expressions into a second artificial generic word; and
   retrieving lemma words from training data and recognizing the words in the call transcript.

8. The method of claim 1 further comprising determining if the call transcript is an automatic speech recognition (ASR) transcript.

9. The method of claim 8 wherein, when the call transcript is determined to be an ASR transcript, performing additional steps of:
   recognizing each utterance; and
   identifying a speaker as one of a customer and an agent for each utterance.

10. The method of claim 9 further comprising automatically extracting speaker identifying keywords from speaker annotated text.

11. The method of claim 9 wherein said identifying a speaker comprises applying learned speaker statistics comprise at least one of:
   p(agent|w) is the probability of the speaker being the agent when word w is given; and
   p(customer|w) is the probability of the speaker being the customer when word w is given.

12. The method of claim 1 wherein automatically detecting utterance boundaries comprises steps of:
   determining word boundaries; and
   deciding if determined word boundaries are utterance boundaries based on analysis of call transcript sections as compared to learned call statistics in an utterance boundary detection model.

13. The method of claim 12 wherein said learned call statistics comprise at least one of:
   $P_L(w_{i-1}, w_i)$ is the probability of $w_{i-1}$ and $w_i$ being the last two words of an utterance;
   $P_L(w_i)$ is the probability of $w_i$ being the last word of an utterance;
   $P_F(w_j)$ is the probability of $w_j$ being the first word of an utterance;
   $P_F(w_j, w_{j+1})$ is the probability of $w_j$ and $w_{j+1}$ being the first two words of an utterance;
   $C(w_i, w_j)$ is the correlation coefficient of $w_i$ and $w_j$ appearing as a bigram within an utterance, wherein the bigram is computed by using Dice coefficient $$\frac{(2 * f(w_i, w_j))}{f(w_i) + f(w_j)};$$

Pause($w_1, w_j$) is the time duration from the end of $w_i$ and the start of $w_j$; and
   Length(U) is the number of words in utterance U, wherein U is defined as an utterance if $w_i$ is determined to be an utterance boundary.

14. The method of claim 1 wherein automatically classifying based on contents of at least one of the utterances comprises steps of:
   detecting at least one predefined feature in the utterance; and
   computing a most likely target call section type for the utterance.

15. The method of claim 14 wherein said detecting at least one predefined feature comprises detecting at least one of speaker identification, call section type of a previous utterance, position of the utterance in the call transcript, a number of domain-specific words in the utterance and words that appear multiple times in the utterance.

16. A system for automatic segmentation of call transcripts into content-based call segments comprising:
   a segmentator component for automatically detecting boundaries between utterances in the call transcripts, for automatically classifying utterances into target call sections based on contents of at least one of the utterances, and for automatically partitioning the call transcript into call segments; and
   an annotator component for annotating the call transcript and for outputting a segmented call transcript.

17. The system of claim 16 further comprising at least one database for storing at least a call segment classification model and an utterance boundary detection model.

18. The system of claim 16 further comprising an automatic speech recognition (ASR) engine.

19. The system of claim 16 further comprising a speaker identification component.

20. The system of claim 16 further comprising a normalization component for normalizing said call transcript.

21. A method for training a system to perform automatic segmentation of call transcripts comprising the steps of:
   providing at least one training transcript with content-based annotated call sections;

normalizing the at least one training transcript; and performing statistical analysis on the at least one training transcript to pre-define features found in call sections of the at least one training transcript and compute statistics for pre-defined features.

22. The method of claim 21 wherein said performing statistical analysis comprise computing statistics for a plurality of features, said features comprising at least one of speaker identification statistics based on occurrence of agent keywords and customer keywords, domain specificity statistics for occurrence of domain specific terms in said call sections, position statistics regarding occurrence of utterances in said call sections, and word appearance statistics regarding occurrence of words in said call sections.

23. Apparatus for training a system to perform automatic segmentation of call transcripts comprising:

a normalization component for obtaining at least one training transcript with content-based annotated call sections and normalizing the at least one training transcript; and a statistical analysis component for performing statistical analysis on the at least one training transcript to pre-define features found it call sections of the at least one training transcript and to compute statistics for pre-defined features.

24. The apparatus of claim 23 further comprising at least one model generation component for generating at least one of a content-based call segment classification model and an utterance boundary detection model based on the statistical analysis.

* * * * *